United States Patent [19]

Montalvo, Jr.

[11] 4,366,884

[45] Jan. 4, 1983

[54] BRAKES AND CLUTCHES

[76] Inventor: Edwin J. Montalvo, Jr., R.R. #2, Box 323B, Merrill Rd., Freeport, Me. 04032

[21] Appl. No.: 197,547

[22] Filed: Oct. 16, 1980

[51] Int. Cl.³ ............................................. F16D 55/04
[52] U.S. Cl. ..................... 188/71.3; 188/72.3; 188/72.4; 188/370; 192/70; 192/88 A
[58] Field of Search ............ 188/71.3, 71.4, 72.3, 188/72.4, 72.5, 366, 368, 369, 370; 192/70, 88 A

[56] References Cited

U.S. PATENT DOCUMENTS

| | | | |
|---|---|---|---|
| 2,136,806 | 11/1938 | Seeley | 188/71.3 |
| 3,060,971 | 10/1962 | Smoll | 192/88 A |
| 3,237,738 | 3/1966 | Suppes et al. | 192/70 |
| 3,889,784 | 6/1975 | Hanks | 188/71.4 |
| 3,993,171 | 11/1976 | Tonn | 188/72.4 |

*Primary Examiner*—Douglas C. Butler
*Attorney, Agent, or Firm*—Brooks, Haidt, Haffner & Delahunty

[57] ABSTRACT

An inexpensive frictional coupling mechanism, useful in smaller brakes and clutches includes an air operated piston and cylinder assembly for single or double-acting use in either a dual disc, single disc or caliper type frictional brake or clutch arrangement.

6 Claims, 9 Drawing Figures

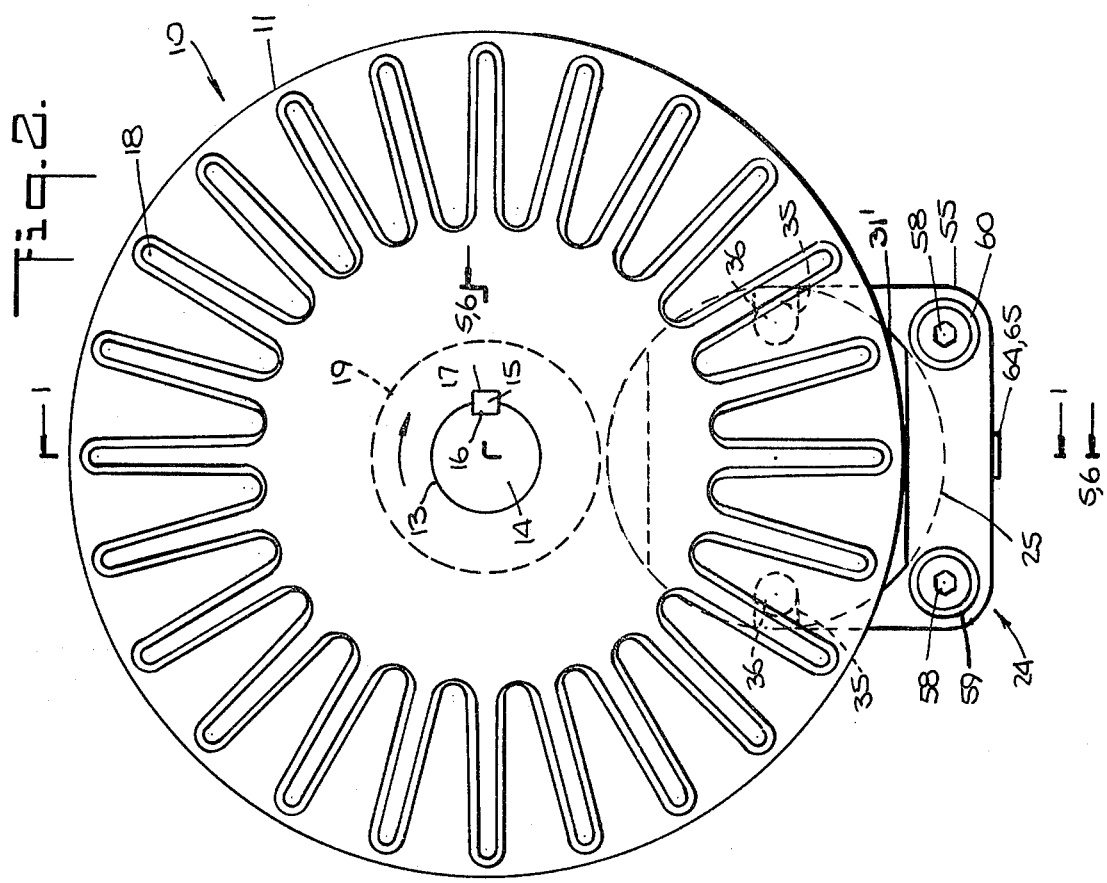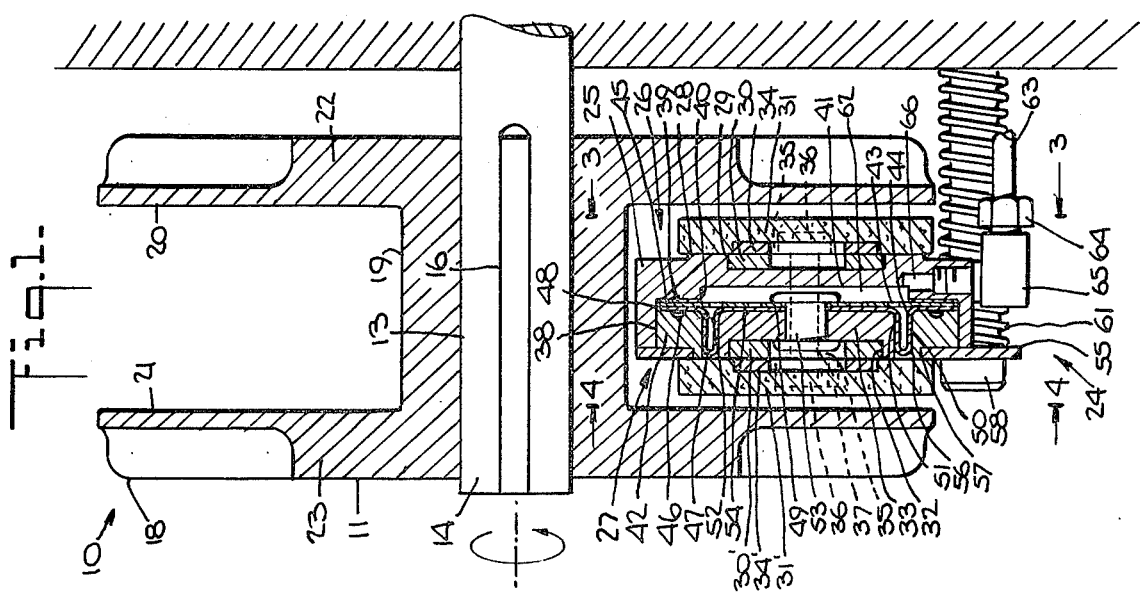

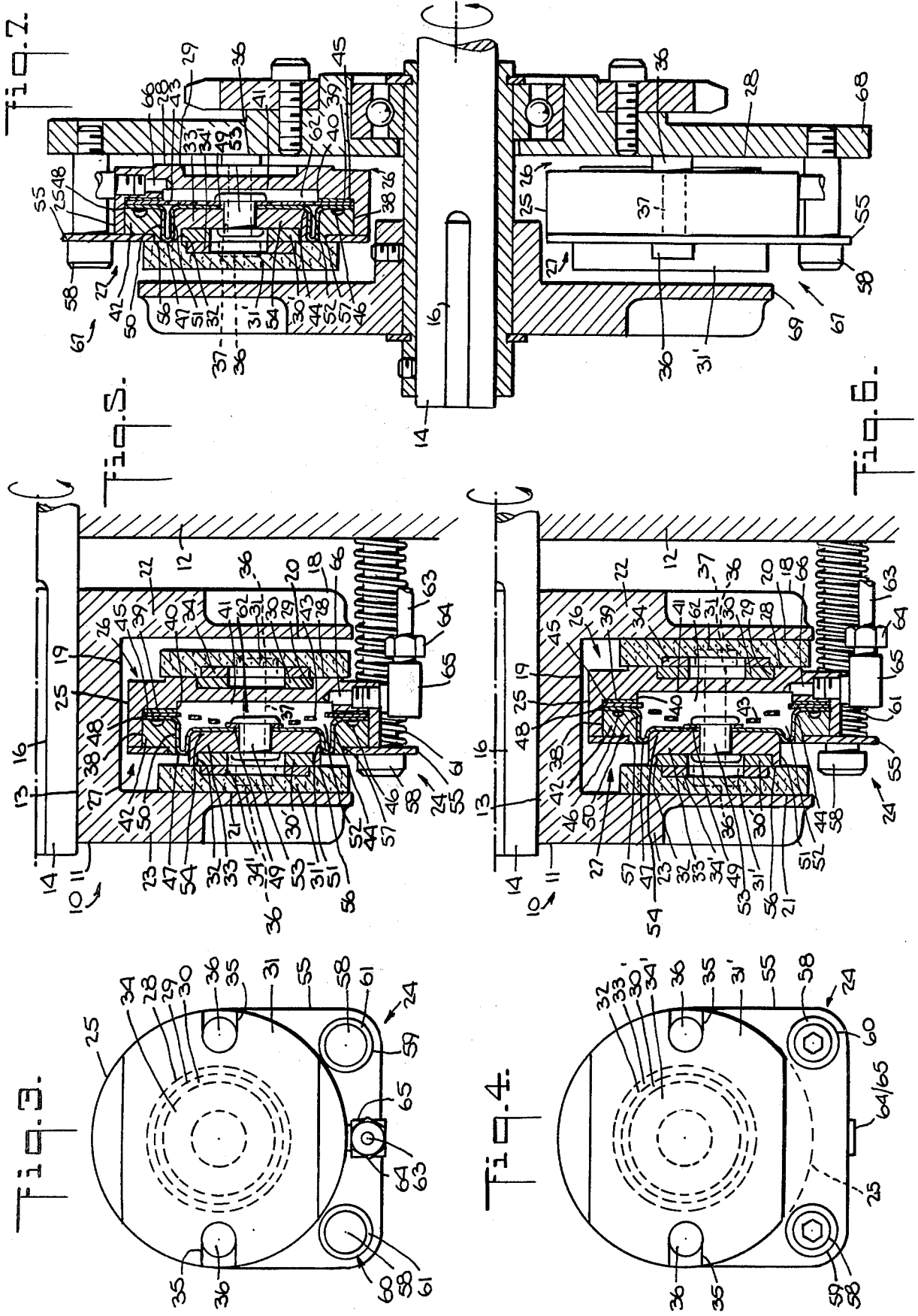

BRAKES AND CLUTCHES

BACKGROUND OF THE INVENTION

1. Field of the Invention

The present invention relates to friction coupling mechanisms such as brakes wherein a rotatable element is frictionally coupled to a relatively nonrotatable element, and clutches wherein two relatively rotatable elements are coupled and uncoupled. More particularly, the invention relates to friction coupling mechanisms having piston and cylinder assemblies with one piston, which can be used interchangeably in dual disc, single disc and caliper coupling arrangements.

2. Description of the Prior Art

Fluid actuated brakes and clutches having friction members driven outwardly in opposite directions to engage opposed discs have been described in Suppes et al, U.S. Pat. Nos. 3,237,738 and 3,311,205 and 3,584,717, as well as in Montalvo U.S. Pat. Nos. 3,696,900 and 4,175,651. Brakes and clutches disclosed in those patents are compact and easy to service. The concept that when hydraulic force is directly applied to one of two opposed friction shoes or pads, there is a simultaneous application of an equal reaction force indirectly imposed on the other shoe by reason of a self-aligning piston and cylinder assembly has been suggested in G. A. Dotto et al, U.S. Pat. No. 3,081,843 and Montalvo, U.S. Pat. No. 4,175,651.

Despite the wide variety of prior art frictional coupling mechanisms, there continues to be a need for a smaller and more versatile piston and cylinder assembly which is compact, low-priced and suitable for use in smaller brakes and clutches.

SUMMARY OF THE INVENTION

The friction brake or clutch of this invention, as illustrated by a presently preferred embodiment, incorporates a single piston and cylinder assembly which is easily adaptable for use in either a single or double-acting frictional coupling arrangement. The piston and cylinder assembly is smaller and simpler than prior known piston and cylinder assemblies. Because fewer parts are employed in this improved assembly, there is a reduction in cost below that of prior art devices, providing a low-priced unit for preferred use in smaller size brake or clutch installations.

As a double-acting unit, the piston and cylinder assembly is mounted as a floating unit between directly opposed friction discs so that the entire assembly moves in either direction parallel to the axis of rotation of the discs. In a typical application a plant air system supplies pneumatic pressure to a single diaphragm type piston guided for axial movement within the piston and cylinder assembly forcing a friction shoe, carried by the outer face of the piston, against the first of two opposed friction discs for frictional engagement therewith. The piston and cylinder assembly can also be actuated hyrdaulically in certain applications. Because the piston and cylinder assembly is permitted to float, an equal and opposite force is exerted on the second of the two friction discs by a friction shoe carried by the end of the piston and cylinder assembly opposite the outer face of the piston. This floating action also adjusts automatically for unequal wearing, if any, of the respective friction shoes. Coiled springs positioned around the mounting studs of the piston and cylinder assembly cause the assembly to return to its original relaxed state when the air supply pressure is removed.

Although a presently preferred embodiment of the invention in the form of a dual-disc brake is described in detail, it will be understood that the principles and structure of the invention are contemplated to have other uses where conventional pneumatic or hydraulic devices are now employed as frictional couplings.

When a plurality of piston and cylinder assemblies are utilized in a brake or clutch, each assembly can be individually controlled through separate regulation of the air supply, if so desired. This and other applications, objects and advantages of the invention will be more fully understood from the following detailed description of a preferred embodiment of the invention, especially when that description is read in conjunction with the accompanying drawing figures.

BRIEF DESCRIPTION OF THE DRAWINGS

In the accompanying drawings, in which like reference numerals indicate like parts throughout:

FIG. 1 is a view in section of a brake according to the invention taken along line 1—1 of FIG. 2 and looking in the direction of the arrows;

FIG. 2 is an end view of a brake embodying a frictional coupling mechanism according to the invention;

FIG. 3 is an end view of a frictional coupling mechanism, taken along line 3—3 of FIG. 1 and looking in the direction of the arrows;

FIG. 4 is an end view of a frictional coupling mechanism, taken along line 4—4 of FIG. 1 and looking in the direction of the arrows;

FIG. 5 is a section view of the brake of FIG. 2 taken along line 5, 6—5, 6 and looking in the direction of the arrows, showing the frictional coupling mechanism in partially engaged condition;

FIG. 6 is a view similar to FIG. 5 showing the frictional coupling mechanism in fully engaged condition;

FIG. 7 is a section view of a single disc clutch embodying frictional coupling mechanisms as utilized in the invention with one friction shoe removed;

DETAILED DESCRIPTION OF PREFERRED EMBODIMENT

Figure 9:
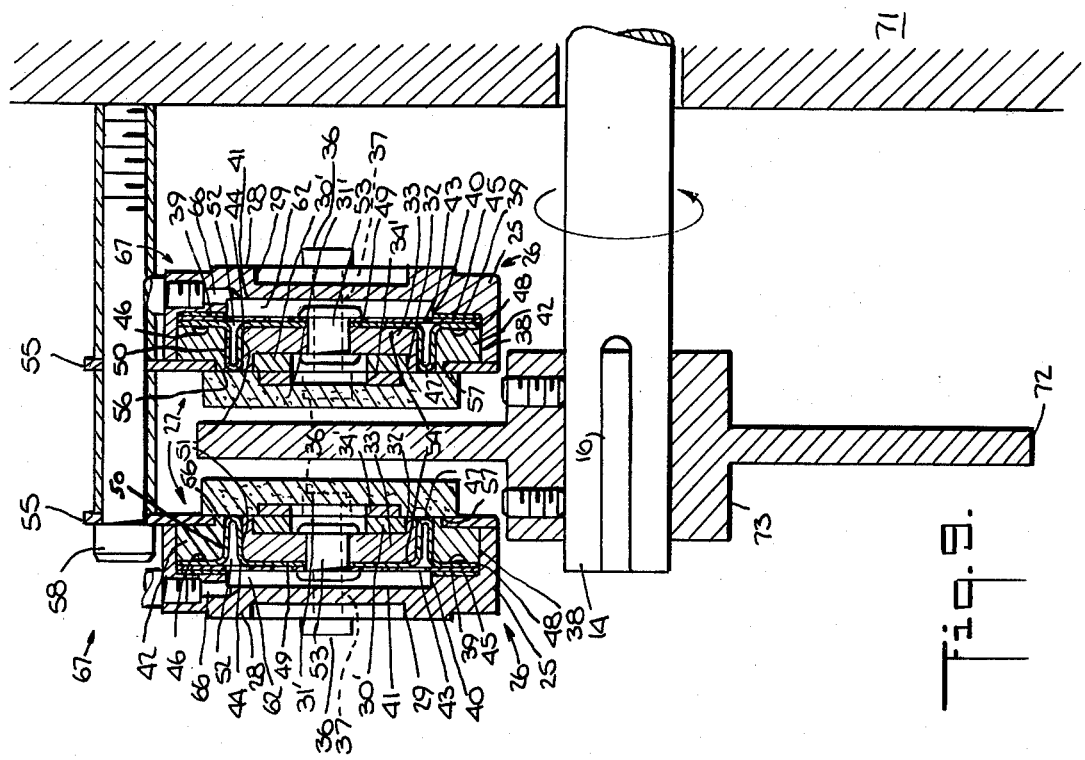
FIG. 9 is a section view of a caliper disc brake embodying two frictional coupling mechanisms as utilized in the invention with one friction shoe removed from each coupling mechanism.

The brake cylinder assembly generally designated by the reference numeral 10 in the drawings is of the type used for selectively frictionally engaging a freely rotatable member 11 with a relatively non-rotatable member 12. As will be generally understood, if the fixed non-rotatable member 12 were replaced with a rotatable member which has its axis aligned with the axis of the rotatable member 11, the device 10 shown would function as a clutch.

The rotatable member 11 is generally cylindrical, with a central axial bore therethrough at 13, tightly fitted on a shaft 14 and secured for rotation therewith by key member 15 which is fitted in a keyseat 16 in the shaft 14 and which projects into a keyway 17 of the bore 13. On opposite ends of the rotatable member 11 and integrally attached thereto are a plurality of cooling fins 18 equally arcuately spaced and extending radially outward to the periphery of the rotatable member 11 from a point approximately midway on each end as measured radially from the centerline of the shaft 14. An annular groove 19 is formed in the rotatable member 11 inwardly extending in a plane transverse to the axis of the shaft 14. Opposed surfaces 20 and 21 of the groove 19 are flat, annular and substantially parallel to each other in a plane transverse to the axis of the shaft 14. Radially extending portions 22 and 23 of the rotatable member 11 can be considered as a pair of opposed, parallel discs for engagement by a double-acting outwardly extensible piston and cylinder assembly generally designated 24 carried between the radial portions 22 and 23 and arranged parallel to the axis of the shaft 14. This piston and cylinder assembly 24 is mounted to the non-rotatable member 12. When the piston and cylinder assembly 24 is in its extended condition, the rotatable member 11 is coupled to the non-rotatable member 12 so as to bring the shaft 14 to rest and to prevent it from rotation as shown in FIG. 6.

As shown in FIGS. 1, 5 and 6, the rotatable member 11 is of unitary construction. In an alternate form of construction, the rotatable member 11 may be constructed of elements secured together either by bolting, by welding, or by a combination thereof.

The non-rotatable member 12 is shown in FIGS. 1, 5 and 6 as a fixed structure, which may be, for example, a part of the frame of the machine for which the brake cylinder assembly 10 is used. The piston and cylinder assembly 24 is mounted to this non-rotatable member 12. In the embodiment illustrated, there is one piston and cylinder assembly 24 located beneath shaft 14 and centered on the vertical centerline of the rotatable member 11 as best seen in FIG. 2, but some other location could be chosen. In addition, more than one piston and cylinder assembly 24 can be provided, with the assemblies 24 equally arcuately spaced about the shaft axis.

The piston and cylinder assembly 24 has a cylinder body 25 with a solid end at 26 and an open end at 27. The solid end 26 has a lip portion 28 projecting therefrom with a bore 29 partially extending inwardly therethrough. A ring member 30 made of magnetized material is seated within the bore 29 and retains the friction shoe or pad 31 in place on the solid end 26 of the cylinder body 25. A similar magnetic ring member 30' is seated within a counterbore 32 formed within piston 33 and retains the friction shoe or pad 31' in place on the piston 33 at the open end 27 of the cylinder body 25.

The friction shoes 31 and 31' are formed from a carbon/graphite base having steel rings 34 and 34' respectively inserted therein. The rings 34 and 34' are received in contact with magnetic rings 30 and 30' and serve to retain the shoes 31 and 31' securely in place.

As best shown in FIGS. 2-4, the friction shoes 31 and 31' have two sides substantially parallel to each other and two sides convex in profile. The convex sides of the friction shoes 31 and 31' each have a slot 35 integrally formed therein.

The cylinder body 25 has a bore 38 therein extending inwardly from the open end 27 to an annular step 39 radially inwardly extending from the cylinder body wall. A second bore 40 extends inwardly from step 39 to the internal surface 41 of the solid end 26 of cylinder body 25. An annular ring 42 is tightly fitted within bore 38 and serves to hold the radially outer edge of a flat disc-like spring 43 and the radially outer edge of a rubber fabric-based diaphragm 44 together and flat against an annular ring-like gasket 45 on the radial surface of step 39. An annular groove 46 is machined into the axially inward side surface of ring 42 which grips the diaphragm 44 retaining the radially outer edge of diaphragm 44 in place.

It will be seen that diaphragm 44 has a full 180° convolution at 47 between the diaphragm edge 48 and the central portion 49 overlying the piston 33. During motion of the piston 33, the diaphragm 44 rolls along the walls 50 and 51 and defines the annular space 52 as shown by the comparison of FIGS. 1, 5 and 6.

The piston 33 is disposed in bore 38 coaxially thereof and is secured to the diaphragm 44 and the spring 43 by a fastener, such as a rivet 53, passing centrally axially therethrough. Piston 33 has a generally cup-shaped head 54 and a counterbore 32 formed in its axially outwardly disposed surface within which the magnetic ring member 30' is received. The piston 33 is made of ferrous material, such as plain carbon steel.

Spring 43 has a central opening therethrough for receiving rivet 53 and has one or more spiral slots arcuately radially extending from said opening to a position substantially set back from the outer periphery. There are some applications in which a piston and cylinder assembly can be operated without use of this spring.

There is a flange 55 at the open end 27 of cylinder body 25 for mounting of the piston and cylinder assembly 24 to the non-rotatable member 12. An outwardly extending circular portion 56 of ring 42 fits closely within the bore 57 of flange 55 and provides for accurate alignment of flange 55 to the cylinder body 25. Two positive fasteners, shown as rivets 37, pass through openings in the flange 55, ring 42, diaphragm 44, spring 43, gasket 45 and cylinder body 25, securely holding together these parts of the piston and cylinder assembly 24. The rivet heads 36 of rivets 37 project into slots 35 and prevent friction shoes 31 and 31' from sliding off rings 30 and 30' during relative movement between the shoes and their respective contact surfaces 20 and 21 of the rotatable member 11.

Shoulder studs 58 pass through flange 55 at locations 59 and 60 for securing the piston and cylinder assembly 24 to the non-rotatable member 12. A coiled spring 61, positioned around each stud 58, serves as a return spring for piston and cylinder assembly 24 when air under pressure in chamber 62 is discharged to disengage the brake. A flexible air hose 63 feeds air under pressure from a plant air supply to the piston and cylinder assembly 24. Hose 63 is preferably secured by a threaded fitting 64 to a nipple 65 at the opening of the passageway 66 at the periphery of the cylinder body 25.

The piston and cylinder assembly 24 has been called double-acting in this description in that both ends carrying the friction shoes 31 and 31' respectively move outward upon actuation and inward upon return. For example, a piston and cylinder assembly 24 can be produced which provides a total extension of approximately ⅜" with friction shoes 31 and 31' each moving outward a distance up to approximately 3/16" and inward upon return by an equal amount. As shown in FIG. 5, friction shoe 31' engages surface 21 of rotatable member 11 when air chamber 62 is pressurized with air from the plant air supply. Because the piston and cylinder assembly 24 is mounted to float between surfaces 20 and 21 in a direction parallel to the axis of rotation of shaft 14, pressurizing the air chamber 62 causes cylinder body 25 to move axially outwardly so as to engage friction shoe 31 with surface 20 of rotatable member 11 as shown in FIG. 6. The free floating mounting of the piston and cylinder assembly 24 causes the friction shoes 31 and 31' to exert equal pressure on surfaces 20 and 21 respectively.

The piston and cylinder assembly 24 can be used interchangeably in dual disc, single disc and caliper coupling arrangements. The presently preferred embodiment of the invention is shown employing the piston and cylinder assembly 24 as a double-acting frictional coupling in a dual disc arrangement. With a relatively minor modification, the piston and cylinder assembly 24 can be easily converted to a single-acting frictional coupling for use in single disc and caliper coupling arrangements. Such modification involves removal of the friction shoe 31, the magnetic ring member 30 and the coiled springs 61.

Figure 8:
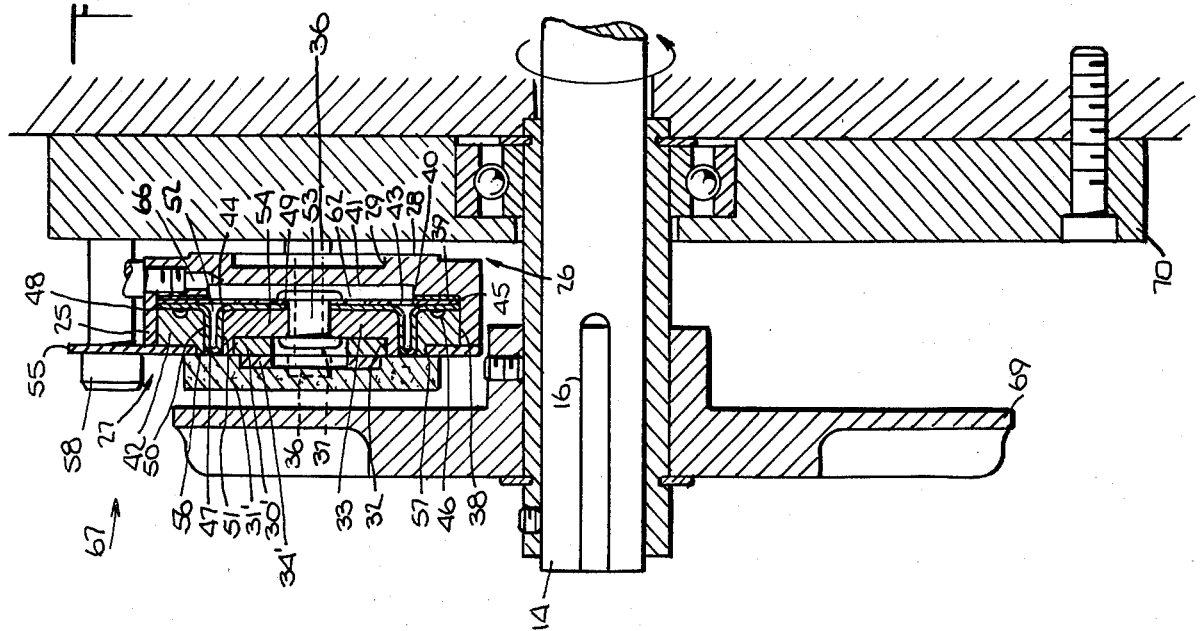
FIG. 8 is a section view of a single disc brake embodying a frictional coupling mechanism as utilized in the invention with one friction shoe removed.

A single-acting outwardly extensible piston and cylinder assembly generally designated 67 is shown in FIGS. 7-9. Piston and cylinder assembly 67 is similar to piston and cylinder assembly 24 with the exception that friction shoe 31 and magnetic ring member 30 have been removed.

As shown in FIG. 7, piston and cylinder assembly 67 is mounted to a fixed non-rotatable member 70. When piston and cylinder assembly is in its extended condition (now shown), the rotatable member 69 is coupled to the non-rotatable member 70 in a single disc brake arrangement so as to bring the shaft 14 to rest and to prevent it from rotation. Although one piston and cylinder assembly 67 is shown mounted to rotatable member 70, more than one assembly 67 can be provided, with the assemblies 67 equally arcuately spaced about the shaft axis.

FIG. 9 shows a caliper disc brake arrangement employing two piston and cylinder assemblies 67 mounted to a fixed member 71 in an opposed face-to-face manner. The extendible portion 72 of the rotatable member 73 moves between the friction shoes 31 as the rotatable member 73 rotates with the shaft 14. When the piston and cylinder assemblies 67 are in their extended condition (not shown), the rotatable member 73 is coupled to the fixed member 71 so as to bring the shaft 14 to rest and to prevent it from rotation. More than one pair of piston and cylinder assemblies 67 can be provided, with each pair of assemblies 67 equally arcuately spaced about the shaft axis.

While a preferred embodiment of the invention has been shown and described, various modifications, as shown by FIGS. 7-9, changes in size and shape of parts, changes in materials, etc., will suggest themselves to those familiar with the art, and such modifications and changes are considered to be within the spirit and scope of the invention.

What is claimed is:

1. A mechanism for selectively frictionally coupling a rotatable body with a relatively non-rotatable body comprising:

two parallel spaced friction discs connected to the rotatable body transverse to the axis of rotation of said rotatable body;

a fluid actuated expandable piston and cylinder assembly mounted to the non-rotatable body between said friction discs and having two directly opposed friction members for engagement with said friction discs upon expansion of the assembly, wherein said piston and cylinder assembly comprises:

a cylinder having one closed end and one open end;

a piston mounted for generally axial movement at the open end of said cylinder;

a flange-type diaphragm secured to an inner face of said piston;

a ring within said cylinder for retaining said piston and diaphragm against a gasketed annular internal surface of said cylinder, an annular groove formed in an axially inner surface of said ring securing the flange of said diaphragm against said gasketed surface of said cylinder; and a rigid flange for mounting said assembly to the non-rotatable body, said rigid flange being attached to said cylinder at the open end thereof by means of a pair of diametrically opposed rivets extending completely through the assembly, heads of said rivets keeping the assembly tightly joined and preventing dislodgement of said friction members upon engagement of said friction members with said friction discs, said rigid flange also having a hole therethrough to permit axial extension of said piston; and a plurality of coil springs positioned between the non-rotatable body and an outwardly extending portion of said rigid flange, each spring encircling one of two bolts which secure said piston and cylinder assembly to the non-rotatable body.

2. The mechanism of claim 1 further comprising: a generally flat disc-like spring secured to said piston and said diaphragm and positioned axially inward of said diaphragm against said gasketed surface of said cylinder for retracting said piston and said diaphragm when fluid pressure is released from said cylinder.

3. A mechanism for selectively frictionally coupling a rotatable body with a relatively non-rotatable body comprising:

a friction disc connected to the rotatable body transverse to the axis of rotation of said rotatable body; and fluid actuated expandable piston and cylinder means mounted to the non-rotatable body and having a friction member for engagement with said friction disc upon expansion of said piston and cylinder means, wherein said piston and cylinder means comprises:

a cylinder having one closed end and one open end;

a piston mounted for generally axial movement at the open end of said cylinder;

a flange-type diaphragm secured to an inner face of said piston;

a ring within said cylinder for retaining said piston and diaphragm against a gasketed annular internal surface of said cylinder, an annular groove formed in an axially inner surface of said ring securing the flange of said diaphragm for a fluid-tight fit against said gasketed surface of said cylinder; and a rigid flange for mounting said assembly to the non-rotatable body, said rigid flange being attached to said piston and cylinder assembly at the piston end thereof by means of a pair of diametrically opposed rivets extending completely through the assembly, heads of said rivets keeping the assembly tightly joined and preventing dislodgement of said friction member with said friction disc, said rigid flange also having a hole therethrough to permit axial extension of said piston.

4. The mechanism of claim 3 further comprising: a generally flat disc-like spring secured to said piston and said diaphragm and positioned axially inward of said diaphragm against said gasketed surface of said cylinder for retracting said piston and said diaphragm when fluid pressure is reduced inside said cylinder.

5. A mechanism for selectively frictionally coupling two relatively rotatable coaxial bodies comprising:
   a friction disc connected to the first one of said bodies transverse to the axis of rotation of said first body;
   fluid actuated expandable piston and cylinder means mounted to the second of said bodies and having friction means for engagement with said friction disc upon expansion of said piston and cylinder means, wherein said piston and cylinder means comprises a plurality of piston and cylinder assemblies equally arcuately spaced around and arranged parallel to the axis of rotation of said bodies, and wherein said friction means comprises a friction member secured to each of said piston and cylinder assemblies, said piston and cylinder assemblies each comprising:
   a cylinder having one closed end and one open end;
   a piston mounted for generally axial movement at the open end of said cylinder; and adapted for mounting of said friction member;
   a flange-type diaphragm secured to an inner face of said piston;
   a ring within said cylinder for retaining said piston and diaphragm against a gasketed annular internal surface of said cylinder, an annular groove formed in an axially inner surface of said ring securing the flange of said diaphragm for a fluid tight fit against said gasketed surface of said cylinder; and
   a rigid flange for mounting said assembly to the second of said bodies, said rigid flange being attached to said piston and cylinder assembly at the piston end thereof by means of a pair of diametrically opposed rivets extending completely through the assembly, heads of said rivets keeping the assembly tightly joined and preventing dislodgement of said friction member upon engagement of said friction member with said friction disc, said rigid flange also having a hole therethrough to permit axial extension of said piston.

6. The mechanism of claim 5 further comprising: a generally flat disc-like spring secured to said piston and said diaphragm and positioned axially inward of said diaphragm against said gasketed surface of said cylinder for retracting said piston and said diaphragm when fluid pressure is reduced inside said cylinder.

* * * * *